US009020301B2

(12) United States Patent  
Morris et al.

(10) Patent No.: US 9,020,301 B2  
(45) Date of Patent: Apr. 28, 2015

(54) METHOD AND SYSTEM FOR THREE DIMENSIONAL MAPPING OF AN ENVIRONMENT

(71) Applicant: Autodesk, Inc., San Rafael, CA (US)

(72) Inventors: Aaron C. Morris, Pittsburgh, PA (US); Seth Koterba, Valrico, FL (US); Marc Zinck, Swissvale, PA (US)

(73) Assignee: Autodesk, Inc., San Rafael, CA (US)

( * ) Notice: Subject to any disclaimer, the term of this patent is extended or adjusted under 35 U.S.C. 154(b) by 289 days.

(21) Appl. No.: 13/632,792

(22) Filed: Oct. 1, 2012

(65) Prior Publication Data

US 2013/0083964 A1 Apr. 4, 2013

Related U.S. Application Data

(60) Provisional application No. 61/540,655, filed on Sep. 29, 2011.

(51) Int. Cl.
| | |
|---|---|
| *G06K 9/32* | (2006.01) |
| *G01S 17/02* | (2006.01) |
| *G01S 17/89* | (2006.01) |
| *G01S 5/16* | (2006.01) |
| *G01S 7/48* | (2006.01) |

(52) U.S. Cl.
CPC .............. *G01S 17/023* (2013.01); *G01S 17/89* (2013.01); *G01S 5/16* (2013.01); *G01S 7/4808* (2013.01)

(58) Field of Classification Search
None
See application file for complete search history.

(56) References Cited

U.S. PATENT DOCUMENTS

| | | | | |
|---|---|---|---|---|
| 6,640,164 | B1 * | 10/2003 | Farwell et al. | 701/2 |
| 6,735,557 | B1 * | 5/2004 | Castellar et al. | 703/5 |
| 6,884,992 | B1 * | 4/2005 | Heiland | 250/234 |
| 6,974,964 | B1 * | 12/2005 | Wang | 250/559.29 |
| 7,603,208 | B2 * | 10/2009 | Garceau et al. | 701/3 |
| 7,630,797 | B2 * | 12/2009 | Garceau et al. | 701/3 |
| 7,933,433 | B2 | 4/2011 | Ogawa | |
| 7,957,562 | B2 * | 6/2011 | Chang et al. | 382/113 |
| 7,983,474 | B2 | 7/2011 | Van Workum et al. | |
| 8,031,909 | B2 * | 10/2011 | Se et al. | 382/106 |
| 8,099,213 | B2 | 1/2012 | Zhang et al. | |
| 8,111,147 | B2 | 2/2012 | Litkouhi | |
| 8,164,543 | B2 | 4/2012 | Seder et al. | |
| 8,306,661 | B2 * | 11/2012 | Ueyama | 700/255 |
| 8,369,606 | B2 * | 2/2013 | Liu et al. | 382/153 |
| 8,588,471 | B2 * | 11/2013 | Hsieh et al. | 382/106 |
| 2005/0246065 | A1 * | 11/2005 | Ricard | 700/258 |

(Continued)

OTHER PUBLICATIONS

PCT International Search Report and Written Opinion dated Feb. 28, 2013 for PCT Application No. PCT/US2012/057960.

*Primary Examiner* — C. P.
*Assistant Examiner* — Mia M Thomas
(74) *Attorney, Agent, or Firm* — Gates & Cooper LLP

(57) ABSTRACT

A three-dimensional modeling system includes a multi-axis range sensor configured to capture a first set of three-dimensional data representing characteristics of objects in an environment; a data sensor configured to capture a first set of sensor data representing distances between at least a subset of the objects and the data sensor; a computer-readable memory configured to store each of the first set of three-dimensional data and the first set of sensor data; a mobile base; a processor; and a computer-readable medium containing programming instructions configured to, when executed, instruct the processor to process the first set of three-dimensional data and the first set of sensor data to generate a three-dimensional model of the environment.

18 Claims, 8 Drawing Sheets

(56) References Cited

U.S. PATENT DOCUMENTS

| | | |
|---|---|---|
| 2006/0007308 A1* | 1/2006 | Ide et al. .................... 348/143 |
| 2006/0210117 A1* | 9/2006 | Chang et al. ................ 382/113 |
| 2006/0233436 A1* | 10/2006 | Ma et al. .................... 382/154 |
| 2007/0064242 A1* | 3/2007 | Childers ..................... 356/601 |
| 2008/0031513 A1* | 2/2008 | Hart ............................ 382/154 |
| 2009/0016642 A1* | 1/2009 | Hart ............................ 382/278 |
| 2009/0132088 A1* | 5/2009 | Taitler ......................... 700/264 |
| 2009/0222229 A1* | 9/2009 | Kakinami .................... 702/97 |
| 2009/0323121 A1* | 12/2009 | Valkenburg et al. ........ 358/1.18 |
| 2010/0026789 A1* | 2/2010 | Balogh ........................ 348/50 |
| 2010/0119120 A1* | 5/2010 | Bronstein et al. ........... 382/113 |
| 2010/0198775 A1 | 8/2010 | Rousselle et al. |
| 2010/0215252 A1* | 8/2010 | Knighton et al. ........... 382/154 |
| 2010/0226541 A1* | 9/2010 | Kobayashi et al. ......... 382/106 |
| 2011/0134225 A1* | 6/2011 | Saint-Pierre et al. ....... 348/47 |
| 2012/0019622 A1 | 1/2012 | Rousselle et al. |
| 2012/0182392 A1* | 7/2012 | Kearns et al. .............. 348/46 |
| 2013/0030758 A1* | 1/2013 | Suzuki et al. ............... 702/167 |
| 2014/0218531 A1* | 8/2014 | Michiguchi et al. ........ 348/148 |
| 2014/0307054 A1* | 10/2014 | Chang et al. ................ 348/47 |
| 2014/0327743 A1* | 11/2014 | Chou et al. ................. 348/47 |
| 2014/0327746 A1* | 11/2014 | Dubois et al. .............. 348/50 |

* cited by examiner

METHOD AND SYSTEM FOR THREE DIMENSIONAL MAPPING OF AN ENVIRONMENT

RELATED APPLICATIONS AND CLAIM OF PRIORITY

This patent document claims priority to U.S. Provisional Patent Application No. 61/540,655, filed Sep. 29, 2011, the disclosure of which is incorporated herein by reference in its entirety.

BACKGROUND

This document describes a novel method and system for acquiring three dimensional (3D) based survey, mapping and image data. In particular embodiments, this document describes self-positioning devices for mobile platforms and the methodology applied to the acquisition of 3D-based data for survey, mapping and modeling of an environment.

The advent of 3D laser scanners and similar technologies has enabled acquisition of accurate and detailed information about the 3D shape and characteristics of objects and environments. For many applications, such as scanning a building, manufacturing facility, processing plant, or underground mine, it is common practice for operators to manually position and operate a 3D scanning device. Manual operation includes placement of targets for registration and the physical transfer of the scanner from one location in an environment to another. Recent technological advances have reduced the time required to complete an individual scan to the point where the targeting procedures and relocation of the scanner represent a significant portion of the project's duration and cost. Furthermore, manual operation limits scanning in active or inhospitable environments.

This document describes a method and system that solves at least some of the issues discussed above, and/or other problems associated with the acquisition and analysis of large 3D based datasets.

SUMMARY

In general, various embodiments of the present disclosure pertain to an apparatus and method for collecting 3D imagery by using a mobile platform to position, orient, and actuate a laser scanner or other 3D imaging device. In various embodiments, the system includes an apparatus, method and associated computer software and algorithms for the self-tracking of position and orientation of a mobile platform during a traverse through an environment for the purpose of producing a registered collection of 3D imagery.

In an embodiment, in a method of creating a three-dimensional model of an environment, a system uses a multi-axis range sensor to capture, from a first location within an environment, a first set of three-dimensional data representing a collection of distance measurements between the first location and a plurality of objects in the environment. The system uses a data sensor to capture, from the first location, a first set of sensor data comprising an image representing distances between each of the objects that are in a field of view of the sensor and the first location. The system saves each of the first set of three-dimensional data and the first set of sensor data to a memory. A processor processes the first set of three-dimensional data to identify a first subset of three-dimensional objects. The processor also processes the first set of sensor data as it is captured to identify a first reference object subset comprising one or more objects in first three-dimensional object subset. The processor maps the first set of three-dimensional data onto the first reference object subset based on relative positions of the objects in the first reference object subset and the first set of three-dimensional data. The system then generates a three-dimensional model of the environment comprising the first set of three-dimensional data referenced to the reference object subset. Optionally, the system may output, via a display, a visual representation of the three-dimensional model in real time as it is generated.

Optionally, the system may use the multi-axis range sensor to capture, from a second location within an environment, a second set of three-dimensional data representing a collection of distance measurements between the multi-axis range sensor and a plurality of objects in the environment. The data sensor may also capture, during a transition from the first location to the second location, a second set of sensor data comprising one or more images taken at one or more locations along a path between the first location and the second location. The system may process the second set of sensor data as it is captured to identify a second reference subset and a position of the second reference location and a pose of the second sensor relative to the first reference location. The system also may process the second set of three-dimensional data to identify a second subset of three-dimensional objects. The system may then map the second set of three-dimensional data onto the second reference object subset based on relative positions of the objects determined in the mapping of the first reference object subset and the first set of three-dimensional data. The system may also use the position of the second location and the pose of the second sensor to match the mapped second set of three-dimensional data to the first subset of three-dimensional objects. In addition, the system may add the second set of three-dimensional data to the three dimensional model of the environment.

Optionally, each three-dimensional data set and each image in the sensor data set may be associated with a time stamp. If so, then the three-dimensional data and the image collected at a common location may be associated with time stamps that are substantially identical.

In some embodiments, the system may use the multi-axis sensor or the data sensor to capture intensity data for each of the objects. If so, when generating the three dimensional model, it may use the intensity data to distinguish a first one of the objects in the environment from a second one of the objects in the environment by applying a different color or shading to the pixels associated with the first and second objects.

In some embodiments, the system may determine a status of generation of the three-dimensional model and output an alert that is indicative of the status of the three-dimensional model generation, such as an image or number showing a percentage or relative amount of progress made or work or time remaining.

Optionally, the system may receive, via a user interface, data captured from a third multi-axis range sensor at a third reference location. If so, it may add, in response to a user command, the data captured from the third multi-axis range sensor to the three-dimensional model.

In some embodiments, the system may start with a saved data set and modify it. For example, the system may receive, via a user interface, an identification of the first location to be specified as part of a prior data set.

The methods and systems described above may be implemented by a three-dimensional modeling system comprising a multi-axis range sensor configured to capture a first set of three-dimensional data representing characteristics of objects in an environment; a data sensor configured to capture a first set of sensor data representing distances between at least a subset of the objects and the data sensor; a computer-readable memory configured to store each of the first set of three-dimensional data and the first set of sensor data; a mobile base; a processor; and a computer-readable medium containing programming instructions configured to, when executed, instruct the processor to process the first set of three-dimensional data and the first set of sensor data to generate a three-dimensional model of the environment. The data sensor may have a resolution that is lower than a resolution of the multi-axis image sensor. In addition, the data sensor may be configured to collect data while the system is in motion and at rest, while the multi axis image sensor is configured to collect data only while the system is in motion.

Those and other details, objects, and advantages of the present invention will become better understood or apparent from the following description and drawings showing embodiments thereof.

DETAILED DESCRIPTION

This disclosure is not limited to the particular systems, devices and methods described, as these may vary. Also, the terminology used in this document is only for the purpose of describing particular versions or embodiments, and it is not intended to limit its scope. As used in the description below and in the appended claims, the singular forms "a," "an," and "the" include plural references unless the context clearly dictates otherwise. Unless defined otherwise, all technical and scientific terms used in this document have the same meanings as commonly understood by one of ordinary skill in the art.

As used in this document, a statement that a device or system is "in electronic communication with" another device or system means that devices or systems are configured to send data, commands and/or queries to each other via a communications network. The network may be a wired or wireless network such as a local area network, a wide area network, an intranet, the Internet or another network.

This document describes a method and 3D-based surveying device that enables the position of a 3D-based surveying device to be automatically tracked without requiring the placement of external reference objects such as targets in, or making other modification to, the environment from which 3D-based data is collected. Various embodiments may provide a faster workflow for manual scanner operation or enable unmanned collection of 3D-based data. In manual form, the method may track the position and orientation of the 3D-based data acquisition system and use the position and orientation to initialize a registration algorithm. In unmanned form, an operator may specify a desired path for a robotic mobile platform to traverse while the device automatically acquires 3D and non-3D data. Following data collection in either manual form or unmanned form, the data is automatically registered and readied for further processing.

Figure 1:
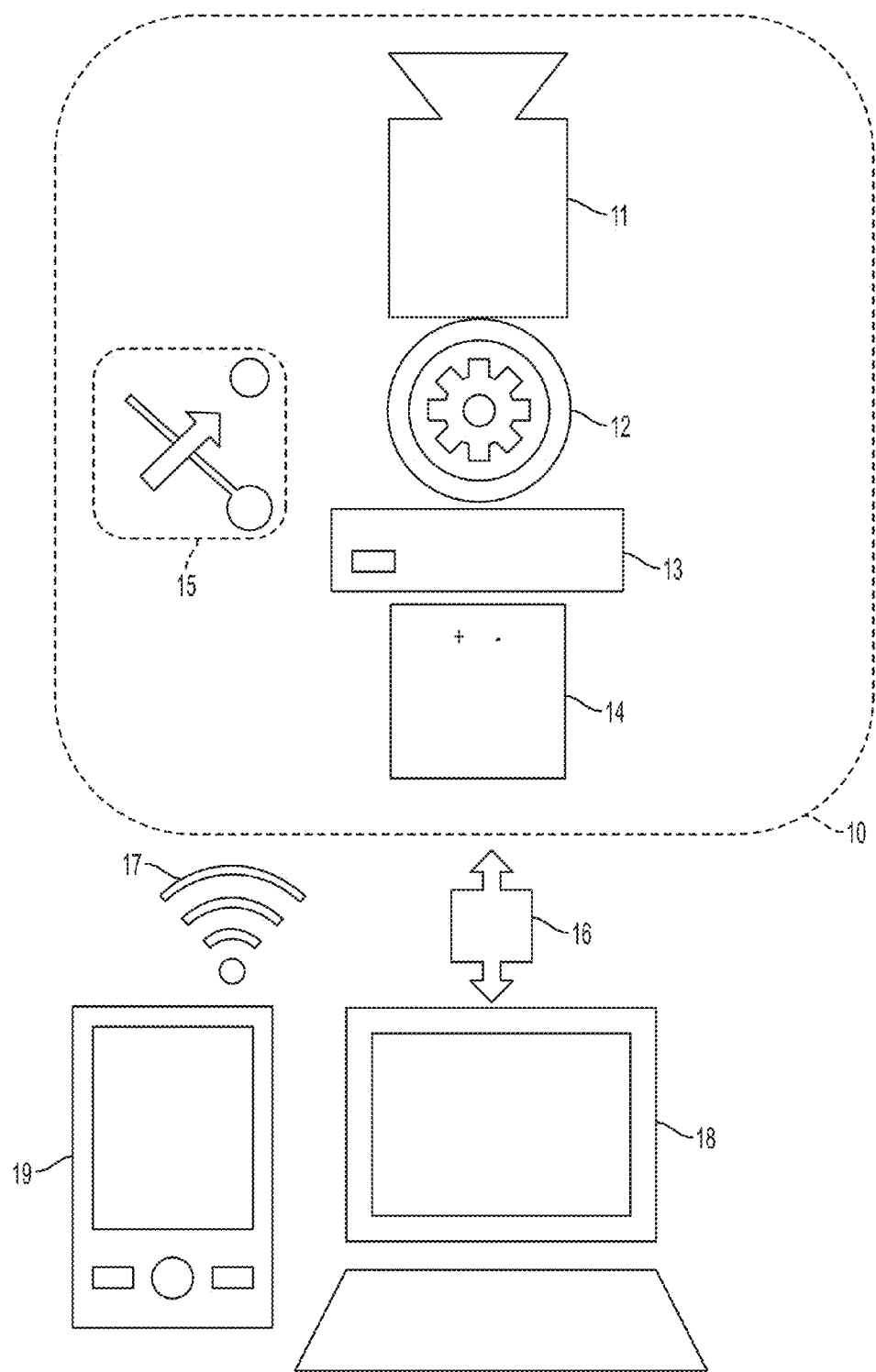
FIG. 1 is a hardware diagram schematically illustrating physical embodiments of the components of an apparatus that self-tracks its position and orientation.

Referring now to FIG. 1, there is shown a diagram illustrating physical embodiments of the components of an image collection and self-tracking system. The system 10 may include a low-resolution data sensor 11 that captures image data for an environment in which the system is positioned. The description of sensor as "low-resolution" is intended to be relative with respect to a multi-axis range sensor that will be described below.

In various embodiments, the data collected by data sensor 11 may be of a resolution that is less than that of the multi-axis range sensor so that the data from sensor 11 may be captured and/or processed more quickly than that of the multi-axis range sensor. For example, the data captured by sensor 11 may be two-dimensional image data comprising a set of pixels, while the data captured by the multi-axis range sensor may include two-dimensional data plus data for a third dimension representing distance from the sensor. The sensor 11 may be one or a combination of multiple sensory devices that have the capability to capture spatial or landmark information from an environment, which includes but is not limited to lasers, lasers scanners, flash LiDAR, stereo vision, structured light, photogrammetric, videogrammetric, acoustic, ultrasonic, radio frequency, RFID and magnetic sensors. The system also may include an inertial measurement senor 12 such as a gyroscope that captures acceleration, velocity, position, and orientation data.

The apparatus 10 is powered via a power source 14 such as a battery. The system may be activated through a switch 15 that connects the power source, and it may accept control signals through a computing device 13 such as an embedded computer having a processor and computer-readable memory. The computing device 13 synchronizes data streams emanating from the sensor 11 and inertial measurement sensor 12, and adds a time stamp (i.e., a token representing a time or location in a sequence at which the data is captured). The processor then relays the data to a processor (shown as part of a computing device 18) via a wired or wireless communication medium 16. The processor 18 may also communicate with one or more computational interface devices 19 via a transceiver over a radio communication medium 17 to provide apparatus control and feedback.

Data produced from the sensor 11 is collected and processed by the processor 18 for the purpose of estimating the movement, position and orientation of the apparatus 10 in an environment. An algorithm for estimating movement is illustrated in FIG. 4.

Figure 4:
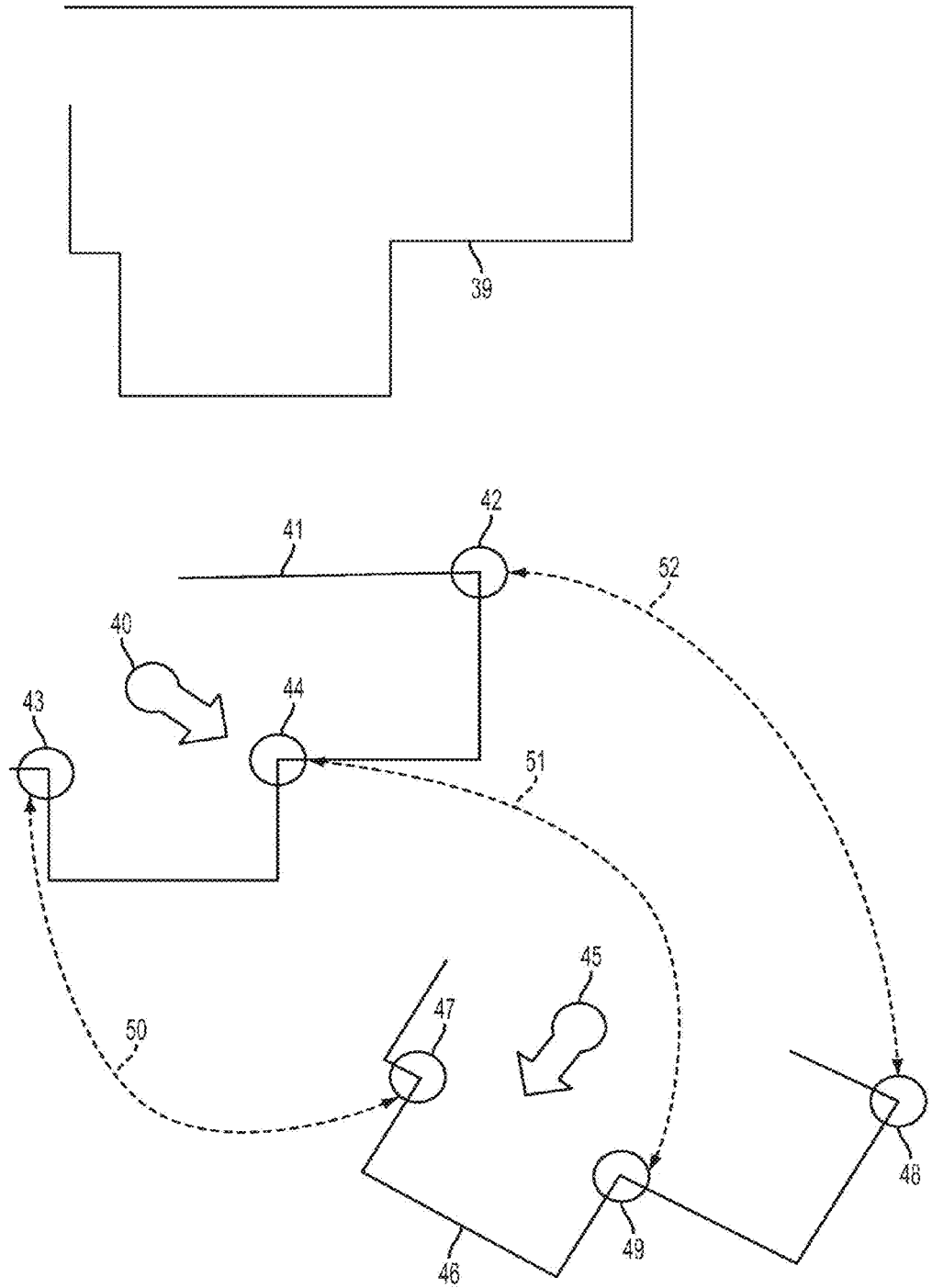
FIG. 4 is a diagram illustrating a feature-based motion tracking process.

Referring now to the illustration in FIG. 4, a motion estimation algorithm may be used to track the system's position and orientation in an environment. The system, if physically located in an environment 39, will capture images of the environment 39 via the low-resolution sensor (element 11 in FIG. 1). These images may be pixel-based, range-based, a collection of beacon signals, or a configuration combining different image types as determined by the characteristics of the sensor. At one moment in time, the sensor will capture a reference image 41 of the environment from a reference location 40. At a second moment in time, the sensor may capture a second image 46 of the environment at a second location 45. The reference image and the second image may include several features in common, as will be described below.

In real time, the system processes each image to identify one or more features of various objects in the environment, such as furniture, doors, windows, signs, computers, or other objects. Any suitable object detection method may be used, such as any now or hereafter known edge detection algorithm such as a search-based edge detection process or a zero-crossing-based edge detection process. The edge detection process may identify features of objects such as corner feature 42, corner feature 43 and corner feature 44 in the reference image 41 and corner feature 47, corner feature 48 and corner feature 49 in the second image 46. The features need not be restricted to corners as illustrated here, but may include points, pixels, edges, curves or arbitrary shapes that are distinct from other portions of the image and reside at varying positions in the image. The system may identify subsets of objects in each image and save each subset to the computer-readable memory.

Following processing of the second image 46, a feature correspondence is determined to match a portion of features in the second image 46 to a portion of features in the reference image 41. As illustrated in FIG. 4, the system applies a feature correspondence process 50 to identify objects and/or features that appear in both the second image and the reference image. Any suitable comparison process may be used, such as looking for matching features using a process or algorithm such as nearest neighbor or closest point. The nearest neighbor may apply to geometric distance between match candidates if the image data is range based, color if the image is pixel based, or any other means to measure a distance between match candidates. Here, corner feature 47 from the second image 46 pairs with (i.e., corresponds to) corner feature 43 in the reference image 41; feature correspondence 51 pairs feature 49 to feature 44; and feature correspondence 52 pairs feature 48 to feature 42. Distances between feature pairs in the second image 46 and the reference image 41 are determined and an optimization algorithm such as least squares, gradient descent, or the Iterative Closest Point (ICP) algorithm is used to minimize the collective sum of all distances for all correspondences by moving the position and pose of the second image 46 closer to the reference image 41.

The result of the optimization algorithm is a transformation that will place the second image location 45 in the coordinate frame of the reference image location 40. The transform also represents the relative change in position and pose (i.e., angular orientation with respect to a reference line, such as a vertical line between the data sensor and ground) of the data sensor or other element of the system as it moves from a first location 40 to a second location 45.

Figure 2:
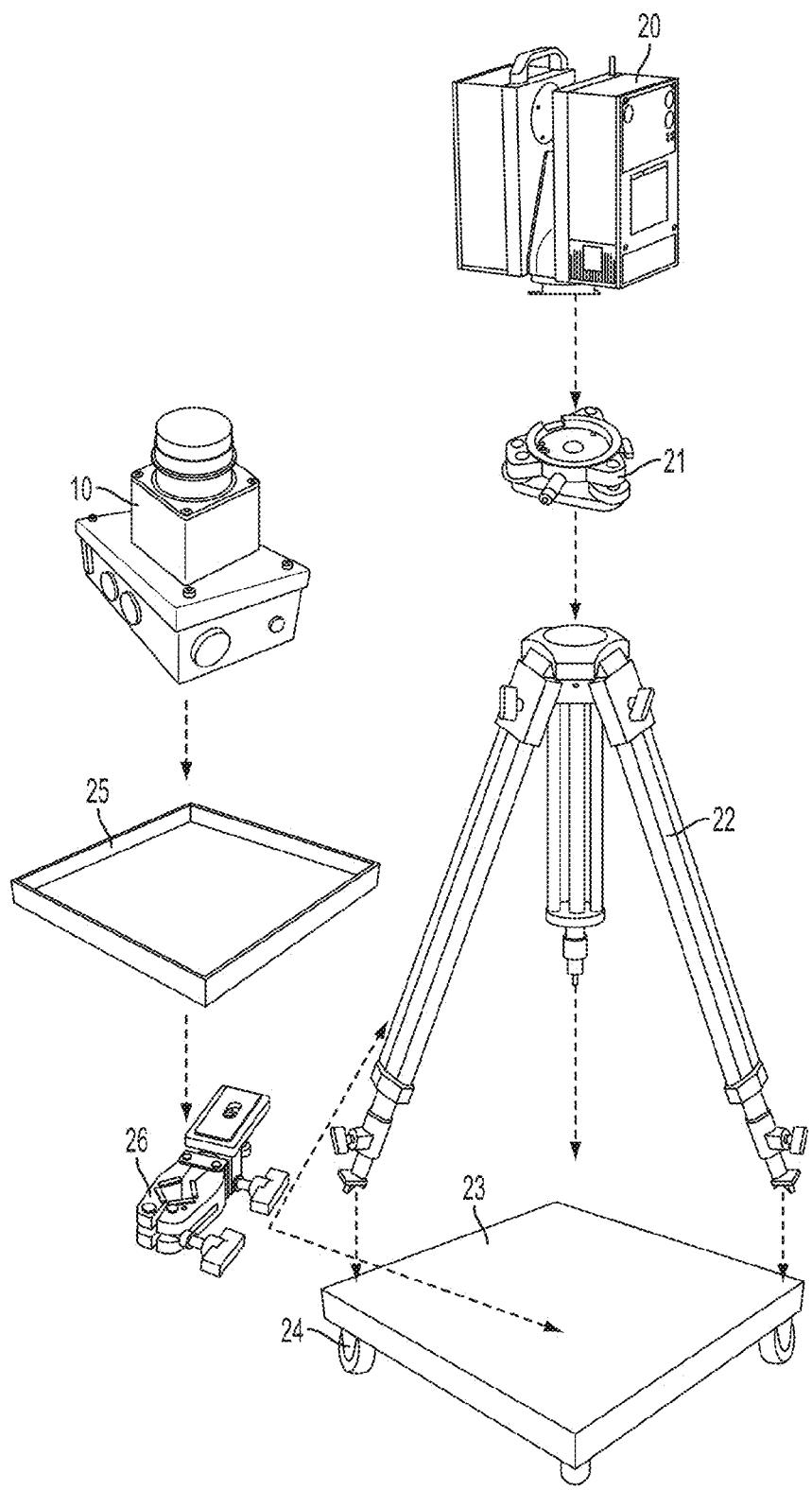
FIG. 2 is a hardware diagram schematically illustrating physical embodiments of the components of the system attached to a mobile platform.

Referring now to the diagram in FIG. 2, a physical embodiment of the system may be affixed to a mobile platform equipped with a multi-axis range sensor 20 for the purpose of creating a three-dimensional model. The multi-axis range sensor 20 may have a resolution that is higher than that of the data sensor 11. For example, a high-resolution laser scanner may be used to gather the detailed three-dimensional data. In general, the information collected by the laser scanner will be dense and highly accurate, and it will be suitable for documenting the spatial structure of the building in detail, but need not be collected in real-time as the platform is in motion. In contrast, the information collected by the low-resolution data sensor may be relatively coarse but suitable to estimate the position and orientation of the platform in real-time. Position and orientation estimates seed a feature-based registration algorithm to align the three-dimensional data and may also provide navigational information.

In this embodiment, the mobile platform includes a height-adjustable tripod 22 that rests on a mobile base 23. Some or all of the system 10 that includes the low-resolution sensor may be connected to (i.e., rest on or be affixed to) a substrate 25 such as a bracket or plate that is connected to a structure on the mobile platform 23 via a securing structure such as a clamp 26. The multi-axis range sensor 20 may also affix to the mobile platform 23 via an elevation-adjustable platform 22 and a clamp 21. Alternatively, some or all of the low-resolution sensor system 10 may be connected to a structure on an elevation-adjustable platform 22, above or below the clamp 21, or embedded into the multi-axis range sensor 20. The low-resolution sensor system 10 electronically communicates with multi-axis range sensor 20 for the purpose of commanding the capture and transfer of three-dimensional data from the multi-axis range sensor 20 to the apparatus 10. The height of the multi-axis range sensor 20 is configurable via an elevation-adjustable platform 22 that may be changed to accommodate specific object heights in the environment.

Figure 3:
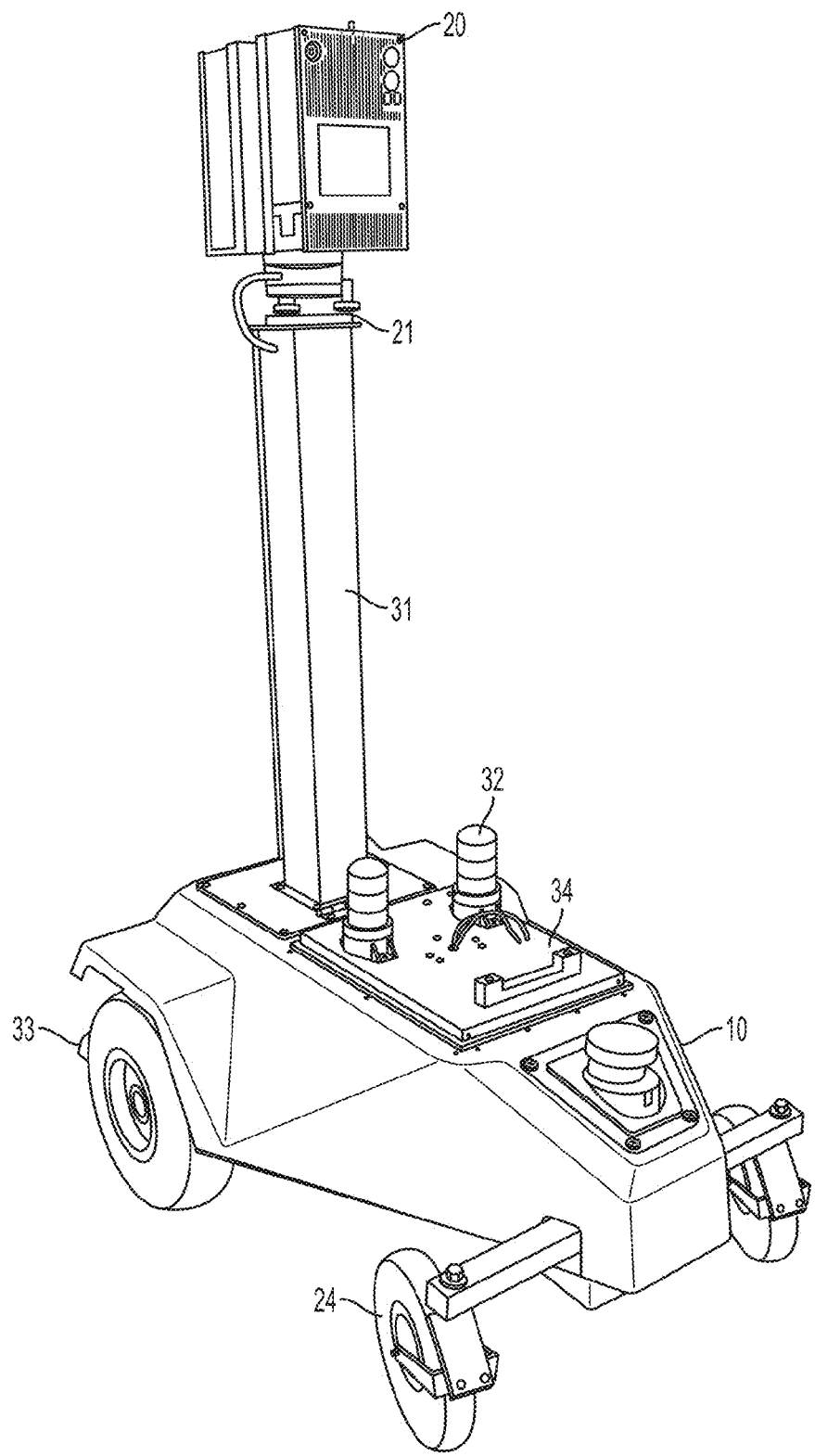
FIG. 3 is a hardware diagram schematically illustrating physical embodiments of the components of a sensing system attached to a robotic mobile platform.

Referring now to the diagram in FIG. 3 there is shown the apparatus affixed to a self-actuated platform capable of autonomous self-navigation and collection of three-dimensional imagery and spatial information from an environment. In this embodiment, the robotic platform 32 includes a self-actuated robotic base 34 where some or all of the system 10 that includes the low-resolution sensor system is mounted. The invention apparatus communicates to an onboard computer and controller in the self-actuated robotic base 34 that drives the platform motors and mobility structures such as wheels 33. The multi-axis range sensor 20 is connected, optionally via a bracket 21, to an optionally height-adjustable mast 31 on the robotic base 34. The self-actuated mobile platform 32 includes a propulsion mechanism (e.g., a motor); steering and braking mechanisms 33; encoders, inertial sensors and a controller; an internal power supply or connection to an external power source; and a processing unit (CPU) in the robotic base 34. The propulsion, steering, and braking mechanisms may be controlled via a processor that is the robotic base 34 or by another processor. The low-resolution sensor system 10 may be connected the self-actuated mobile platform and may electronically communicate with the robotic base 34. The height of the multi-axis range sensor 20 may be configurable via a height-adjustable platform mount 21 that may be changed to accommodate specific object heights in the environment.

In still further detail, the multi-axis range sensor 20 shown in both FIG. 2 and FIG. 3 is capable of quickly measuring dense spatial information about its environment. Such information may include three-dimensional range/point measurements, corresponding intensity/grayscale information, color information, and surface normals. The multi-axis range sensor 20 shown in both FIG. 2 and FIG. 3 is actuated by and in electronic communication with the low-resolution sensor system 10 shown in both FIG. 2 and FIG. 3.

Figure 5:
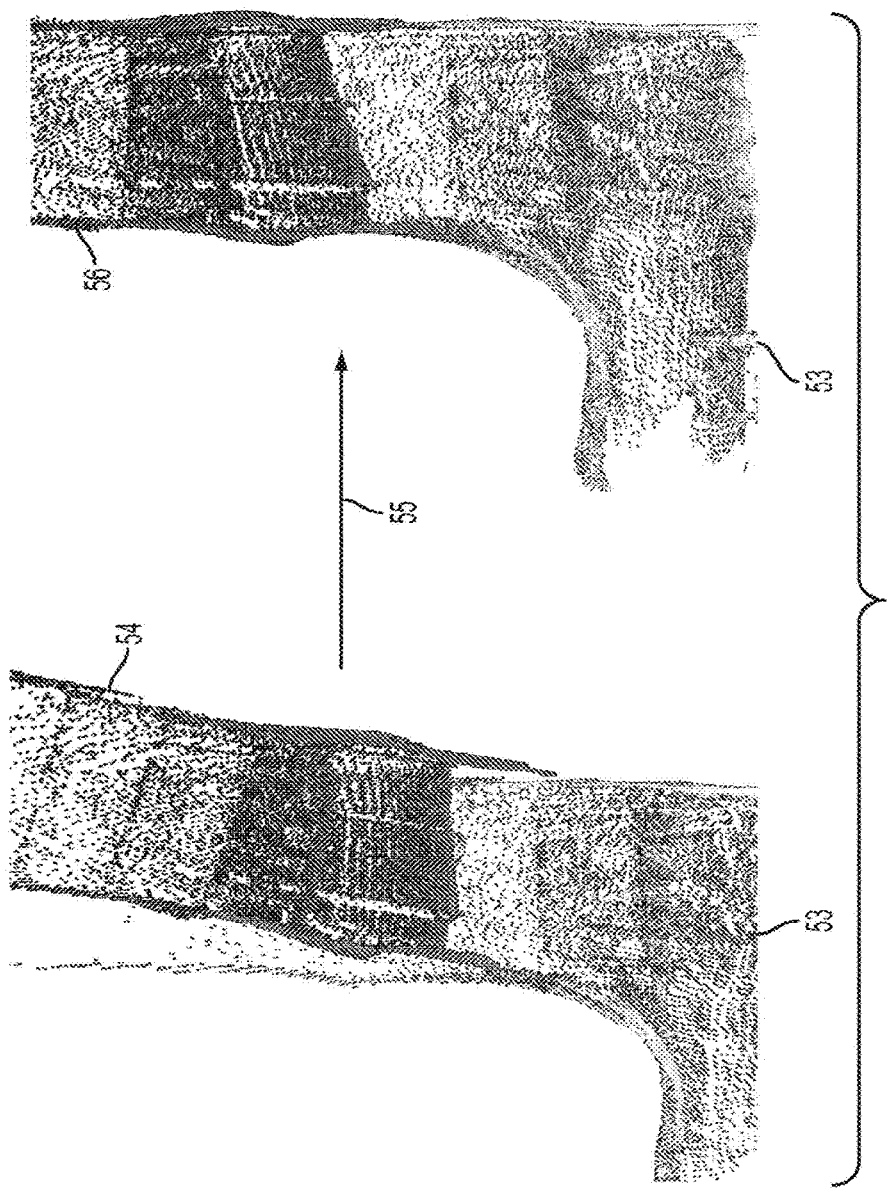
FIG. 5 is an image illustrating three-dimensional registration and location.

The low-resolution sensor system and multi-axis range sensor work in tandem to produce a three-dimensional model of the environment. Referring now to the diagram in FIG. 5, a reference three-dimensional data set 53 is collected from an environment at a reference location. The multi-axis range sensor is then moved to a second location in the environment. During transition from the reference location to the second location, the apparatus tracks the position and orientation of the multi-axis sensor using a motion estimation process previously described. A second three-dimensional data set 54 is then captured at a secondary location where the position and orientation estimated by the low-resolution sensor system is used to roughly place the second three-dimensional data set 54 in the same coordinate system relative to the reference three-dimensional data set 53. The system may assign a time stamp to each of the images and/or data sets so that when the low-resolution data set and a high-resolution data set are compared, the system may require that the data sets have time stamps that are substantially the same, or that the time stamps have not more than a threshold amount of difference.

In still more detail, a registration process may be used to perform a fine alignment of second three-dimensional data set 54 relative to the reference data set 53. Features, that may include flat surfaces, corners or the entire collection of measurements itself, are extracted from both the second three-dimensional data set 54 and the reference data set 53. The motion estimation process described in FIG. 4 may be applied now to these three-dimensional features to complete the alignment. Three-dimensional features may be matched into corresponding pairs. and an optimization algorithm such as least squares, gradient descent, or the Iterative Closest Point (ICP) algorithm may be employed to reduce or minimize the total distance between some or all corresponding pairs. The result of the registration process is a transform 55 that is applied to the second three-dimensional data set 54 and creates an aligned version of the second three-dimensional data set 56 relative to the reference three-dimensional data set. The aligned second three-dimensional data set 56 is added to the reference three-dimensional data set 53 and constitutes a registered three-dimensional model.

To continue the construction of the three-dimensional model, the apparatus and multi-axis range sensor repeat the process of being moved to static locations; capturing three-dimensional data; and adding three-dimensional data to the three-dimensional model through a registration algorithm that is initialized with an estimate of position and orientation provided by the motion estimation algorithm and apparatus. Note that the algorithm discussed assumes that the mobile platform is immobile while the multi-axis imaging sensor is in operation. It is also possible to operate in a mode wherein the multi-axis imaging sensor operates continuously, and the feedback to the computer is used to construct a three-dimensional model. Furthermore, the motion estimation algorithm or registration algorithm may be modified to or customized to particular environments or adapted to make use of additional information that may be available.

If a three-dimensional data set from a multi-axis range sensor that is not augmented with a low-resolution sensor system requires registration to a registered three-dimensional model, a manual position and orientation estimate can be substituted for the motion estimate of the low-resolution sensor system.

Figure 6:
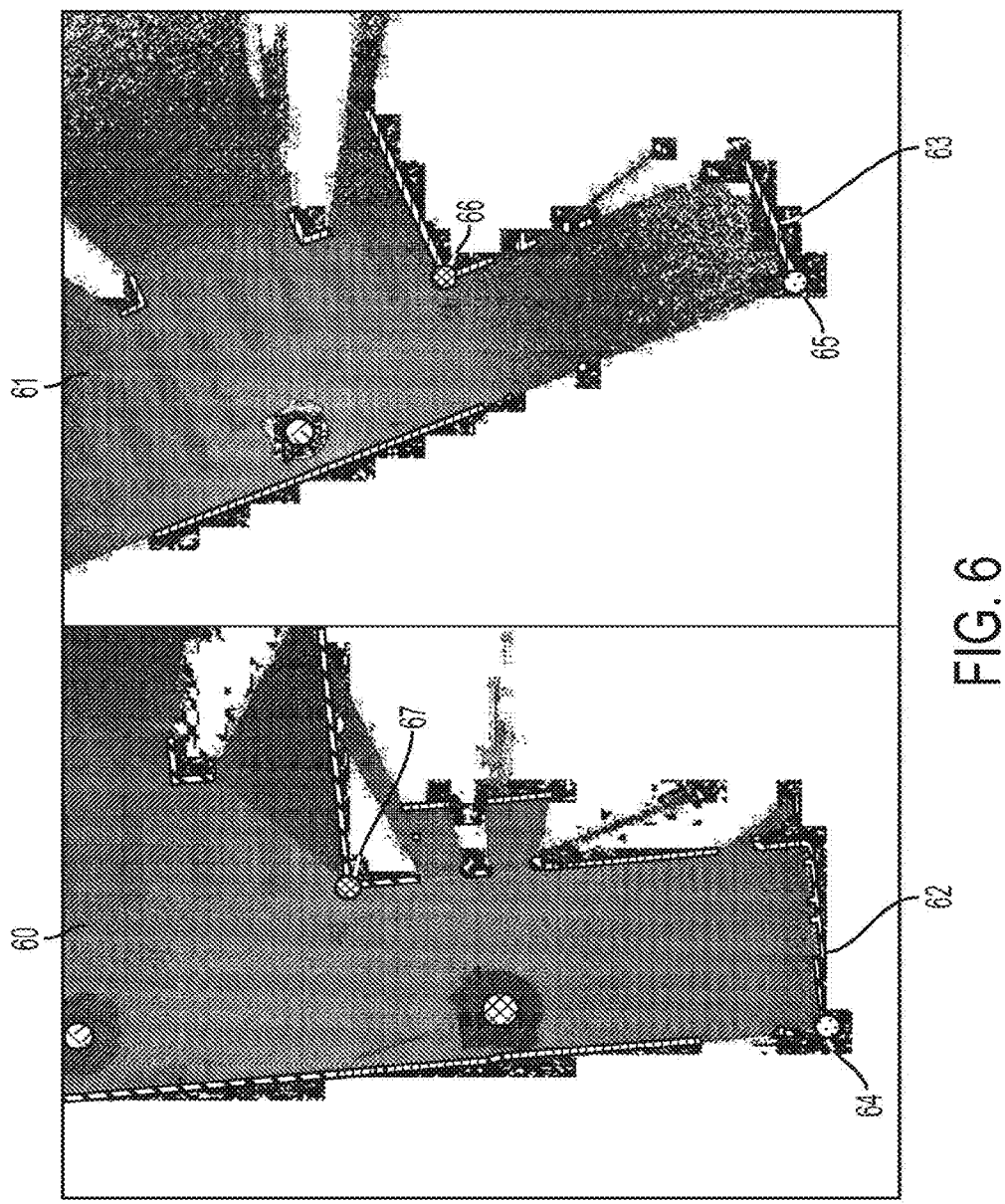
FIG. 6 is an image describing a manual registration interface.

Referring now to FIG. 6, a visual display, which optionally may be part of or electronically connected to the computer 18 or remote computational interface 19, can provide a visual context of both the reference three-dimensional data set 60 and a second three-dimensional data set 61. Features determined from the reference three-dimensional data set 62 and the second three-dimensional data set 63 may be distinctly visualized by color or a comparable highlight method to aid in the manual selection of correspondence pair. The display may output an image showing where two or more pairs of points of features that overlap between the reference three-dimensional data set 60 and the second three-dimensional data set 61 form a correspondence pair. In this illustrative example, corner 67 and corner 64 in the reference data set 60 are matched with corner 66 and corner 65 in the second data set 61. A visual preview of the second data set 61 in the first data set 60 may be output via the display to allow a user validate the proper match selection. The user may then enter a selection of whether or not the match is correct, via a user interface such as a keyboard, touch screen, or pointing device.

If the match selection requires improvement (e.g., if the user indicates that the match is not correct), the process can be performed again until a visibly suitable match is made. A suitable or validated match is then registered in the manner previously described and added to the three-dimensional model.

Optionally, the multi-axis sensor may capture intensity data for each of the objects. For example, lighter-colored objects may exhibit a higher intensity, while darker-colored objects may exhibit a lower intensity. The system may then use this intensity data to distinguish between objects, or between various features of individual objects, in the environment. It may also apply this intensity data to illustrate such distinctions, either in grayscale or with the application of a colorization process. For example, if the intensity data is specific enough to measure the luminance of an object, such as on a scale of 0 (black) to 255 (white), it may apply the intensity data to each image data point (e.g., pixel) and use the intensity data to colorize the image.

Figure 7:
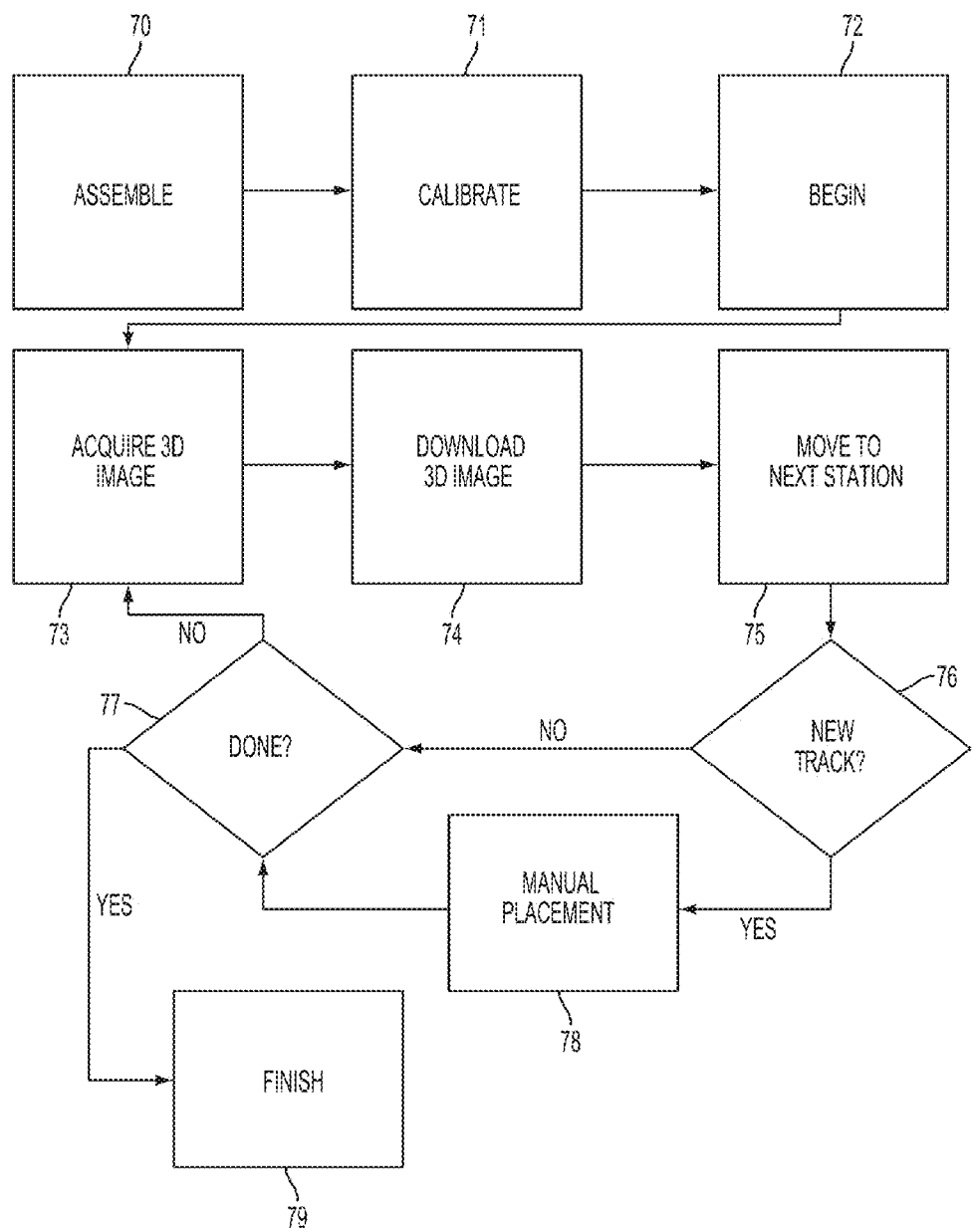
FIG. 7 is a diagram that details a workflow enabling an operator to control the device and perform a data collection.

Referring now to FIG. 7, there is shown a flowchart of a process that may be used by the system to execute a project. A project may begin with the assembly of the multi-axis range sensor and motion estimation apparatus onto the mobile platform 70. The multi-axis range sensor is calibrated to the motion estimation apparatus 71 to establish a spatial mapping between the multi-axis range sensor and the low-resolution sensor system. The system is then ready to begin 72 collecting data for the purpose of contracting a three-dimensional model. A first three-dimensional data set is captured 73 at a first location in an environment and downloaded or otherwise saved to a memory 74 to establish a reference. A data sensor such as a low-resolution data sensor also captures data representing objects that are in a field of view of the data sensor and the first location. Alternatively, the system may receive, via a user interface, a first location identifier and/or time stamp, and the system may access a data store to retrieve a data set that corresponds to the first location and/or the time stamp.

The system is then moved to a second location 75 in the environment. Or, if a saved data set is retrieved, the second location may be the current location of the system. If no error has occurred and the second location is in an overlap region to the reference location 76 and the process is not complete 77, a second three-dimensional data set is captured 73 and saved to repeat the process. A data sensor such as a low-resolution data sensor also captures data representing objects that are in a field of view of the data sensor and the second location. If an error did occur, an alert may be issued to issue a corrective action by the operator. If the second stationary location is not in an overlap region, manual placement 78 of the data may occur.

This process may be repeated at a third location, or any number of locations. Once the process is repeated through the entirety of the project environment, the data set is deemed complete and the project is finished 79. Optionally, the multi-axis range sensor may collect data only while the system is at rest and not moving within the environment. The data sensor also may capture image data as the system is at rest, and optionally also while the system is moved between various locations in the environment.

Figure 8:
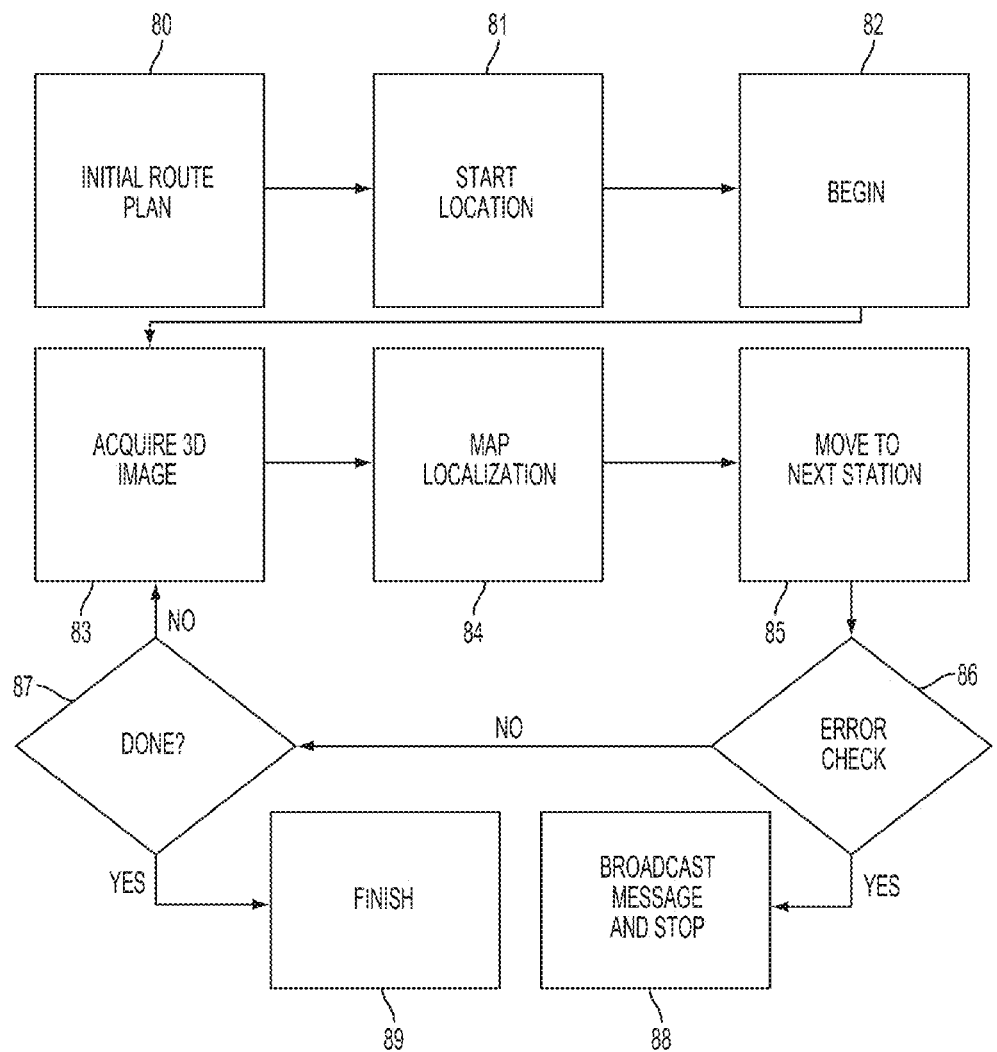
FIG. 8 is a diagram that details the workflow enabling an operator to control the device and perform a data collection from a robotic mobile platform.

Referring now to the embodiment that uses a self-actuated platform in more detail, in FIG. 8 there is shown a flowchart of a process that may execute a project from a self-controlled mobile platform. In some embodiments, a project may begin with the specification of an initial route plan 80. This initial route plan 80 consists of a reasonably accurate and detailed map or plan of the environment to be surveyed. This map can be in the form of image, computer aided design (CAD) or made from prior scans. The initial route plan 80 also may indicate locations for acquisition of the three-dimensional data sets. An operator or a remote system may uploads or otherwise transmit the initial route plan 80 to the mobile platform. Once the initial route plan 80 is uploaded, the operator places the self-controlled mobile platform at a desired start location 81. This location may also be indicated on the initial route plan 80.

The self-controlled mobile platform next receives a Begin 82 or similar command from the user, upon which it commences autonomous operation. Operating autonomously, the system acquires a three-dimensional data set 83 using the multi-axis range sensor. After acquiring the three-dimensional data 83, the CPU analyzes all information available to it from all sources, including the multi-axis range sensor. The low-resolution sensor system establishes and maintains position and orientation information in the reference to the map 84.

Next, the robotic mobile platform performs a move to the next survey station 85. It does so using real-time feedback from the odometry sensors on the mobile platform 14 as well as the self-tracking information provided by the low-resolution sensor system. During its move to the next survey station 85, the mobile platform continually undergoes an error check 86 to determine if the desired destination has been reached. If the error check 86 is positive—for example a safety and guidance sensor indicates that the path is blocked—then the broadcast error message and stop 88 procedure is executed, wherein the nature of the error is transmitted via the radio transceiver to the operator and subsequent action is halted. If the error check 86 is negative, then a Done 87 test may be performed. The Done 87 test determines if the end of the route plan is reached. If the Done 87 test is positive, then the invention has completed the data acquisition and a Finish 89 step is taken. The Finish 89 step includes the transfer of data from the robotic mobile platform to an off-board computer for evaluation and further processing. If the Done 87 test is negative, then the system returns to the "Acquire 3D image" 83 step and repeats the process.

In various embodiments, the system may enable the collection and registration of large amounts of three-dimensional range data and spatial information of a scene fast and effectively. The system utilizes novel methods applied to three-dimensional data capture processes and autonomous mobile platform capable of self-propulsion that is controlled by an on-board central processing unit. In some embodiments, the system may reduce or eliminate the need for an operator to plan imaging locations, actuate data collection, register multiple three-dimensional datasets together, place and remove survey targets for registration, or physically move the three-dimensional imaging sensor to multiple locations. The system also may permit easy reconfiguration of the three-dimensional imaging sensor to substitute other various three-dimensional imaging capabilities.

In broad embodiments, the system may include a mobile platform, motion detection, 3D imaging sensor, a processor, data, and a computer-readable medium that holds programming instructions that, when executed, instruct the processor to implement a methodology including mathematical models and algorithms to automatically or semi-automatically navigate through and acquire 3D images of a scene.

Certain embodiments may be sensor-agnostic and may use various types of sensors that collects 3D imagery or spatial information, including but not limited to laser scanners, flash LiDAR, stereo vision, structured light, photogrammetric, or videogrammetric sensors. Certain embodiments may incorporate any combination of sensors (both 3D and non-3D sensors) so long as each sensor measurement can be synchronized to other sensor measurements in the combination. The system may be applied to a wide variety of environments such as buildings; manufacturing, production, or industrial plants; archeological or historical sites; cityscapes; mines, tunnels or sewers; and ships and vessels.

Various components of the system may include a computing system having a processor, a computer-readable storage medium, and programming instructions that, when executed, instruct the processor to perform various functions. The computing system also may include a user interface for input (such as a touch screen, key pad, or audio input) and output (such as a display, an audio speaker, or printer).

The description in this document enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods within the scope and spirit of the invention.

Some or all of the features and functions described above may be combined into many other different systems or applications. The disclosed embodiments are intended to include not only those specifically described, but also various presently unforeseen or unanticipated alternatives, modifications, variations or improvements that may be made by those skilled in the art.

The invention claimed is:

1. A method of creating a three-dimensional model of an environment, comprising:
   using a multi-axis range sensor to capture, from a first location within an environment, a first set of three-dimensional data representing a collection of distance measurements between the first location and a plurality of objects in the environment;
   using a data sensor to capture, from the first location, a first set of sensor data comprising an image representing distances between each of the objects that are in a field of view of the data sensor and the first location;
   saving each of the first set of three-dimensional data and the first set of sensor data to a memory;
   processing the first set of three-dimensional data to identify a first subset of three-dimensional objects;
   processing the first set of sensor data as it is captured to identify a first reference object subset comprising one or more objects in the first subset of three-dimensional objects;
   mapping the first set of three-dimensional data onto the first reference object subset based on relative positions of objects that appear in both the first reference object subset and the first set of three-dimensional data;
   generating a three-dimensional model of the environment comprising the first set of three-dimensional data referenced to the reference object subset;
   using the multi-axis range sensor to capture, from a second location within the environment, a second set of three-dimensional data representing a collection of distance measurements between the multi-axis range sensor and a plurality of objects in the environment;

using the data sensor to capture, during a transition from the first location to the second location, a second set of sensor data comprising one or more images taken at one or more locations along a path between the first location and the second location;

processing the second set of sensor data as it is captured to identify a second reference subset and a position of the second location and a pose of the data sensor relative to the first location;

processing the second set of three-dimensional data to identify a second subset of three-dimensional objects;

mapping the second set of three-dimensional data onto the second reference object subset based on relative positions of the objects determined in the mapping of the first reference object subset and the first set of three-dimensional data;

using the position of the second location and the pose of the data sensor to match the mapped second set of three-dimensional data to the first subset of three-dimensional objects;

identifying an overlapping set of three-dimensional objects comprising three-dimensional objects that are part of both the first subset of three-dimensional objects and the second subset of three-dimensional objects; and adding the second set of three-dimensional data to the three dimensional model of the environment.

2. The method of claim 1, wherein:

each of the three-dimensional dimensional data sets is associated with a time stamp;

each image in each of the sensor data sets is associated with a time stamp; and the three-dimensional data and the image collected at a common location are associated with time stamps that are substantially identical.

3. The method of claim 1, further comprising:

using the multi-axis range sensor or the data sensor to capture intensity data for each of the objects; and when generating the three dimensional model, using the intensity data to distinguish a first one of the objects in the environment from a second one of the objects in the environment by applying a different color or shading to pixels associated with the first and second objects.

4. The method of claim 1, further comprising outputting, via a display, a visual representation of the three-dimensional model in real time as it is generated.

5. The method of claim 1, further comprising:

determining a status of generation of the three-dimensional model; and outputting an alert that is indicative of the status of the three-dimensional model generation.

6. The method of claim 1, further comprising:

receiving, via a user interface, data captured from a third multi-axis range sensor at a third reference location; and adding, in response to a user command, the data captured from the third multi-axis range sensor to the three-dimensional model.

7. The method of claim 1, further comprising receiving, via a user interface, an identification of the first location to be specified as part of a prior data set.

8. A three-dimensional modeling system, comprising:

a multi-axis range sensor configured to capture, from a first location within an environment, a first set of three-dimensional data representing a collection of distance measurements between the first location and a plurality of objects in the environment;

a data sensor configured to capture, from the first location, a first set of sensor data comprising an image representing distances between each of the objects that are in a field of view of the data sensor and the first location;

a computer-readable memory configured to store each of the first set of three-dimensional data and the first set of sensor data;

a processor and computer-readable programming instructions that, when executed, instruct the processor to:

process the first set of three-dimensional data to identify a first subset of three-dimensional objects;

process the first set of sensor data as it is captured to identify a first reference object subset comprising one or more objects in the first subset of three-dimensional objects;

map the first set of three-dimensional data onto the first reference object subset based on relative positions of the objects in the first reference object subset and the first set of three-dimensional data;

generate a three-dimensional model of the environment comprising the first set of three-dimensional data referenced to the reference object subset;

use the multi-axis range sensor to capture, from a second location within the environment, a second set of three-dimensional data representing a collection of distance measurements between the multi-axis range sensor and a plurality of objects in the environment;

use the data sensor to capture, during a transition from the first location to the second location, a second set of sensor data comprising one or more images taken at one or more locations along a path between the first location and the second location;

process the second set of sensor data as it is captured to identify a second reference subset and a position of the second location and a pose of the data sensor relative to the first location;

process the second set of three-dimensional data to identify a second subset of three-dimensional objects;

map the second set of three-dimensional data onto the second reference object subset based on relative positions of the objects determined in the mapping of the first reference object subset and the first set of three-dimensional data;

use the position of the second location and the pose of the data sensor to match the mapped second set of three-dimensional data to the first subset of three-dimensional objects;

identify an overlapping set of three-dimensional objects comprising three-dimensional objects that are part of both the first subset of three-dimensional objects and the second subset of three-dimensional objects; and add the second set of three-dimensional data to the three dimensional model of the environment.

9. The system of claim 8, wherein:

each three-dimensional data set is associated with a time stamp;

each image in each sensor data set is associated with a time stamp; and the three-dimensional data and the image collected at a common location are associated with time stamps that are substantially identical.

10. The system of claim 8, wherein the computer-readable programming instructions that, when executed, also instruct the processor to:

use the multi-axis range sensor or the data sensor to capture intensity data for each of the objects; and when generating the three dimensional model, use the intensity data to distinguish a first one of the objects in the environment from a second one of the objects in the environment by applying a different color or shading to pixels associated with the first and second objects.

11. The system of claim 8, further comprising a display configured to output a visual representation of the three-dimensional model in real time as it is generated.

12. The system of claim 8, wherein the computer-readable programming instructions that, when executed, also instruct the processor to:
   determine a status of generation of the three-dimensional model; and
   output an alert that is indicative of the status of the three-dimensional model generation.

13. The system of claim 8, wherein the computer-readable programming instructions that, when executed, also instruct the processor to:
   receive, via a user interface, data captured from a third multi-axis range sensor at a third reference location; and
   add, in response to a user command, the data captured from the third multi-axis range sensor to the three-dimensional model.

14. The system of claim 8, further comprising a user interface configured to receive an identification of the first location to be specified as part of a prior data set.

15. The system of claim 8, further comprising:
   a mobile base; and
   an inertial measurement sensor configured to detect movement of the mobile base.

16. The system of claim 15, further comprising:
   a propulsion mechanism; and
   a braking mechanism.

17. A three-dimensional modeling system, comprising:
   (a) a multi-axis range sensor configured to:
      (1) capture, from a first location in an environment, a first set of three-dimensional data representing characteristics of objects;
      (2) capture, from a second location within the environment, a second set of three-dimensional data representing a collection of distance measurements between the multi-axis range sensor and a plurality of objects in the environment;
   (b) a data sensor configured to:
      (1) capture a first set of sensor data representing distances between at least a subset of the objects and the data sensor;
      (2) capture, during a transition from the first location to the second location, a second set of sensor data comprising one or more images taken at one or more locations along a path between the first location and the second location;
   (c) a computer-readable memory configured to store each of the first set of three-dimensional data and the first set of sensor data;
   (d) a mobile base;
   (e) a processor; and
   (f) a computer-readable medium containing programming instructions configured to, when executed, instruct the processor to:
      (1) process the first set of three-dimensional data to identify a first subset of three-dimensional objects;
      (2) process the first set of sensor data as it is captured to identify a first reference object subset comprising one or more objects in the first subset of three-dimensional objects;
      (3) map the first set of three-dimensional data onto the first reference object subset based on relative positions of the objects in the first reference object subset and the first set of three-dimensional data;
      (4) generate a three-dimensional model of the environment comprising the first set of three-dimensional data referenced to the reference object subset;
      (5) process the second set of sensor data as it is captured to identify a second reference subset and a position of the second location and a pose of the data sensor relative to the first location:
      (6) process the second set of three-dimensional data to identify a second subset of three-dimensional objects;
      (7) map the second set of three-dimensional data onto the second reference object subset based on relative positions of the objects determined in the mapping of the first reference object subset and the first set of three-dimensional data;
      (8) use the position of the second location and the pose of the data sensor to match the mapped second set of three-dimensional data to the first subset of three-dimensional objects;
      (9) identify an overlapping set of three-dimensional objects comprising three-dimensional objects that are part of both the first subset of three-dimensional objects and the second subset of three-dimensional objects; and
      (7) add the second set of three-dimensional data to the three dimensional model of the environment.

18. The system of claim 17:
   wherein the data sensor has a resolution that is lower than a resolution of the multi-axis image sensor; and
   wherein the data sensor is configured to collect data while the system is in motion and at rest, while the multi axis image sensor is configured to collect data only while the system is at rest.

* * * * *